(12) United States Patent
Sawai et al.

(10) Patent No.: US 8,408,709 B2
(45) Date of Patent: Apr. 2, 2013

(54) ILLUMINATION OPTICAL SYSTEM AND PROJECTOR

(75) Inventors: Yasumasa Sawai, Yamatotakada (JP); Iwao Adachi, Moriguchi (JP)

(73) Assignee: Konica Minolta Opto, Inc., Tokyo (JP)

( * ) Notice: Subject to any disclaimer, the term of this patent is extended or adjusted under 35 U.S.C. 154(b) by 301 days.

(21) Appl. No.: 12/958,645

(22) Filed: Dec. 2, 2010

(65) Prior Publication Data

US 2011/0141438 A1  Jun. 16, 2011

(30) Foreign Application Priority Data

Dec. 11, 2009  (JP) ................................. 2009-281253

(51) Int. Cl.
*G03B 21/14* (2006.01)
(52) U.S. Cl. .................... 353/20; 353/94; 349/9; 362/19
(58) Field of Classification Search .................... 353/20, 353/94; 349/5, 7, 8, 9; 362/19, 551, 561, 362/227, 234
See application file for complete search history.

(56) References Cited

U.S. PATENT DOCUMENTS

| | | | |
|---|---|---|---|
| 6,222,674 B1 | 4/2001 | Ohta | 359/618 |
| 7,048,396 B2 * | 5/2006 | Schmidt et al. | 362/19 |
| 7,481,538 B2 * | 1/2009 | Furusawa et al. | 353/20 |
| 7,717,578 B2 * | 5/2010 | Drazic | 362/19 |
| 2010/0045937 A1 * | 2/2010 | Li | 353/31 |
| 2011/0273862 A1 * | 11/2011 | Li et al. | 362/19 |

FOREIGN PATENT DOCUMENTS

| | | |
|---|---|---|
| JP | 3610789 B2 | 10/2004 |
| JP | 2006-30330 A | 2/2006 |
| JP | 2007-140344 A | 6/2007 |

\* cited by examiner

*Primary Examiner* — William C Dowling
(74) *Attorney, Agent, or Firm* — Cozen O'Connor

(57) ABSTRACT

First and second light sources emit first and second light beams, respectively. A light condensing system condenses the beams, and a polarization separation system separates each of the beams into first and second polarization components. A ½ phase plate converts the polarization state of the first polarization component to one equal to that of the second polarization component, and a rod integrator uniformizes spatial energy distribution of the beams condensed by the light condensing system. A relay system forms an image of an exit face of the rod integrator on a region to be illuminated. The light condensing system condenses the first and second polarization components onto first and second regions, respectively, of an entrance face of the rod integrator; and the ½ phase plate is placed at the first region of the entrance face of the rod integrator or at a position conjugate with the first region.

10 Claims, 4 Drawing Sheets

ILLUMINATION OPTICAL SYSTEM AND PROJECTOR

This application is based on Japanese Patent Application No. 2009-281253 filed on Dec. 11, 2009, the contents of which are hereby incorporated by reference.

BACKGROUND OF THE INVENTION

1. Field of the Invention

The present invention relates to an illumination optical system and a projector, and specifically relates to an illumination optical system for illuminating an image display surface of a display device such as a digital micromirror device or a liquid crystal display (LCD), and a projector provided therewith.

2. Description of Related Art

In recent years, there have been growing needs for projection by using polarization in a DLP projector (DLP (digital light processing): registered trademark of Texas Instruments Limited in USA). One example of such projection is 3D projection which is performed using polarization glasses, and another is high-contrast projection which is performed using a polarization screen. Polarization is used in either projection; however, since DLP projectors typically use randomly polarized light, if projection is performed with a DLP projector by using polarization, a half or more of the amount of the light is inefficiently lost without being used. This makes it difficult to realize projection onto a large screen. Patent Documents 1 to 4 each propose a projector in which an improved method is used to convert polarization or combine light beams from two lamps, but none of them propose a bright illumination optical system that uses a rod integrator suitable for the DLP and that also uses two lamps and converts polarization.

Patent Document 1: JP-A-2000-131647
Patent Document 2: JP-A-2006-30330
Patent Document 3: JP-A-2007-140344
Patent Document 4: U.S. Pat. No. 6,222,674B1

The illumination optical system proposed in Patent Document 1 is configured such that polarization conversion is performed at an entrance face of a rod integrator by displacing imaging positions of light beams on a polarization-by-polarization basis. Such polarization conversion helps make effective use of the amount of light, but, since no mechanism for combining light beams from two-lamps is adopted, a projection image obtained by using this illumination optical system cannot be sufficiently bright. In addition, a prism is used as a polarization beam splitter, and this limits the direction of polarization separation and the polarization component, and thus accordingly limits the layout, which is inconvenient.

The illumination optical system proposed in Patent Document 2 is configured such that light beams from two lamps are combined at an entrance face of a rod integrator by making light beams from the two-lamp sources form images at the same position. However, since no mechanism for polarization conversion is adopted, effective projection cannot be performed by using polarization, which is inconvenient.

The illumination optical system proposed in Patent Document 3 is configured such that light beams from two lamps are combined by making light beams from the two-lamp sources form images at different positions in an entrance face of a rod integrator. However, since no mechanism for polarization conversion is adopted, effective projection cannot be performed by making use of polarization, which is inconvenient.

The illumination optical system proposed in Patent Document 4 is configured such that both the combining of light beams from two lamps and polarization conversion are performed. However, since a lens array is used as an integrator, illumination light beams from lenses of the lens array are liable to be displaced from each other on a display device, where they should be superimposed on each other, and spread light resulting from the displacement becomes ghost light and degrades the quality of projection. In addition, because there is no room for disposing a color wheel, it is not suitable for a single-plate type DLP.

SUMMARY OF THE INVENTION

The present invention has been made in view of the foregoing, and an object of the present invention is to provided a compact illumination optical system capable of performing a highly-efficient, high-quality bright illumination, and a projector capable of obtaining a bright high-quality projection image by being provided with the illumination optical system.

According to one aspect of the present invention, an illumination optical system is provided with: a first light source that emits a first light beam; a second light source that emits a second light beam; a light condensing optical system that condenses the first light beam and the second light beam; a polarization separation optical system that separates each of the first light beam and the second light beam into a first polarization component and a second polarization component; a ½ phase difference plate that converts a polarization state of the first polarization component to a polarization state equal to a polarization state of the second polarization component; a rod integrator that uniformizes spatial energy distribution of the first light beam and the second light beam that have undergone condensation by the light condensing optical system; and a relay optical system that forms an image of an exit face of the rod integrator on a region to be illuminated. Here, the light condensing optical system condenses the first polarization component onto a first region of an entrance face of the rod integrator and condenses the second polarization component onto a second region of the entrance face of the rod integrator, and the ½ phase difference plate is placed at the first region of the entrance face of the rod integrator or at a position conjugate with the first region of the entrance face of the rod integrator.

According to another aspect of the present invention, a projector is provided with: an illumination optical system; a display device having an image display surface to be illuminated by the illumination optical system; and a projection optical system that magnifies and projects an image formed on the image display surface onto a screen. Here, the illumination optical system is provided with: a first light source that emits a first light beam; a second light source that emits a second light beam; a light condensing optical system that condenses the first light beam and the second light beam; a polarization separation optical system that separates each of the first light beam and the second light beam into a first polarization component and a second polarization component; a ½ phase difference plate that converts a polarization state of the first polarization component to a polarization state equal to a polarization state of the second polarization component; a rod integrator that uniformizes spatial energy distribution of the first light beam and the second light beam that have undergone condensation by the light condensing optical system; and a relay optical system that forms an image of an exit face of the rod integrator on a region to be illuminated. Here, the light condensing optical system condenses the first polarization component onto a first region of an entrance face of the rod integrator and condenses the second polarization component onto a second region of the entrance face of the rod integrator, and the ½ phase difference plate is placed at the first region of the entrance face of the rod integrator or at a position conjugate with the first region of the entrance face of the rod integrator.

DETAILED DESCRIPTION OF PREFERRED EMBODIMENTS

Hereinafter a description will be given of embodiments, etc. of an illumination optical system and a projector of the present invention, with reference to the accompanied drawings. Among different embodiments, the same or corresponding parts are identified by the same reference signs, and overlapping description of the same parts will be omitted if possible.

First Embodiment

See FIGS. 1, 2, 3A and 3B

Figure 1:
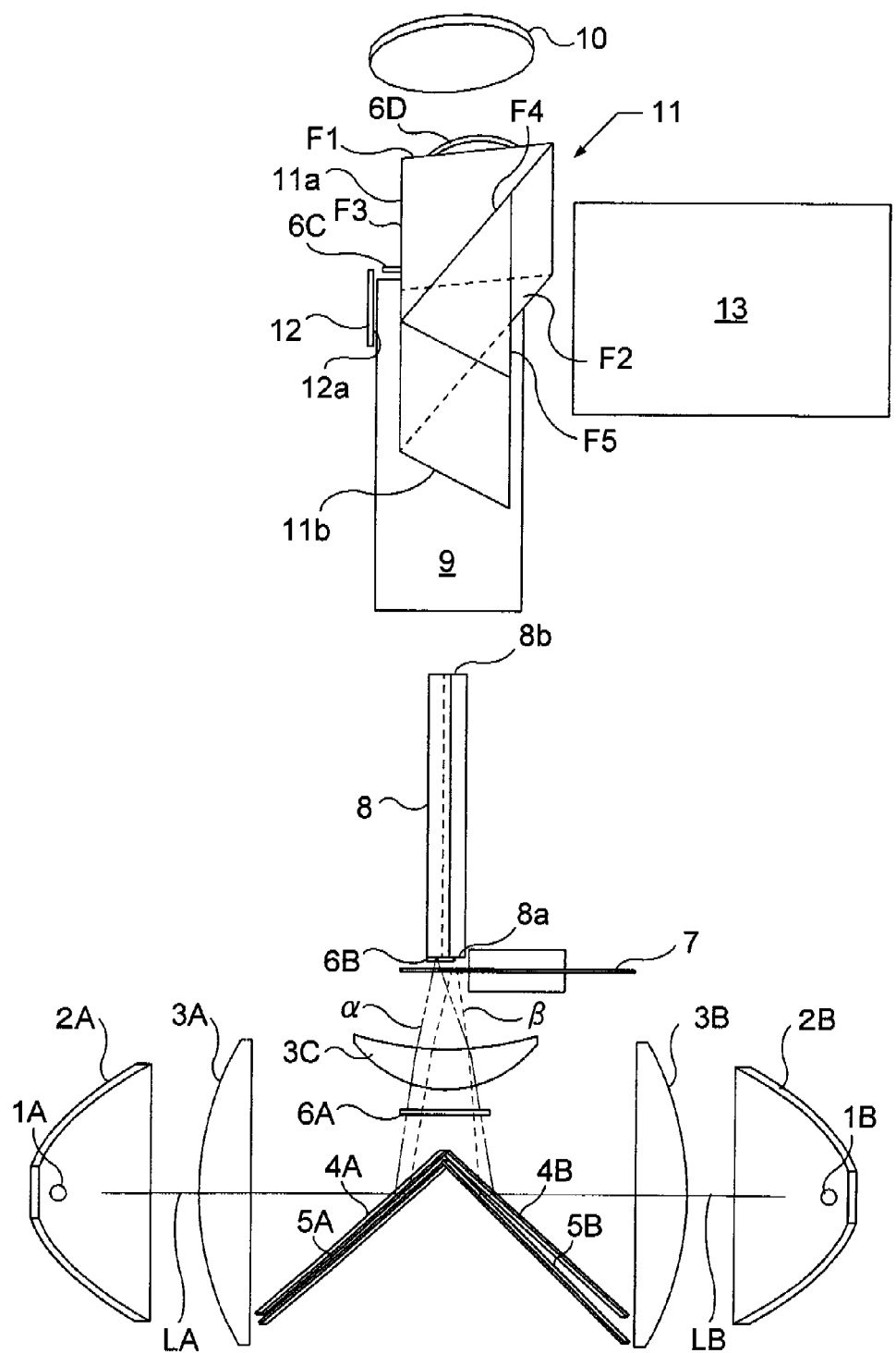
FIG. 1 is a plan view showing a first embodiment.
Figure 2:
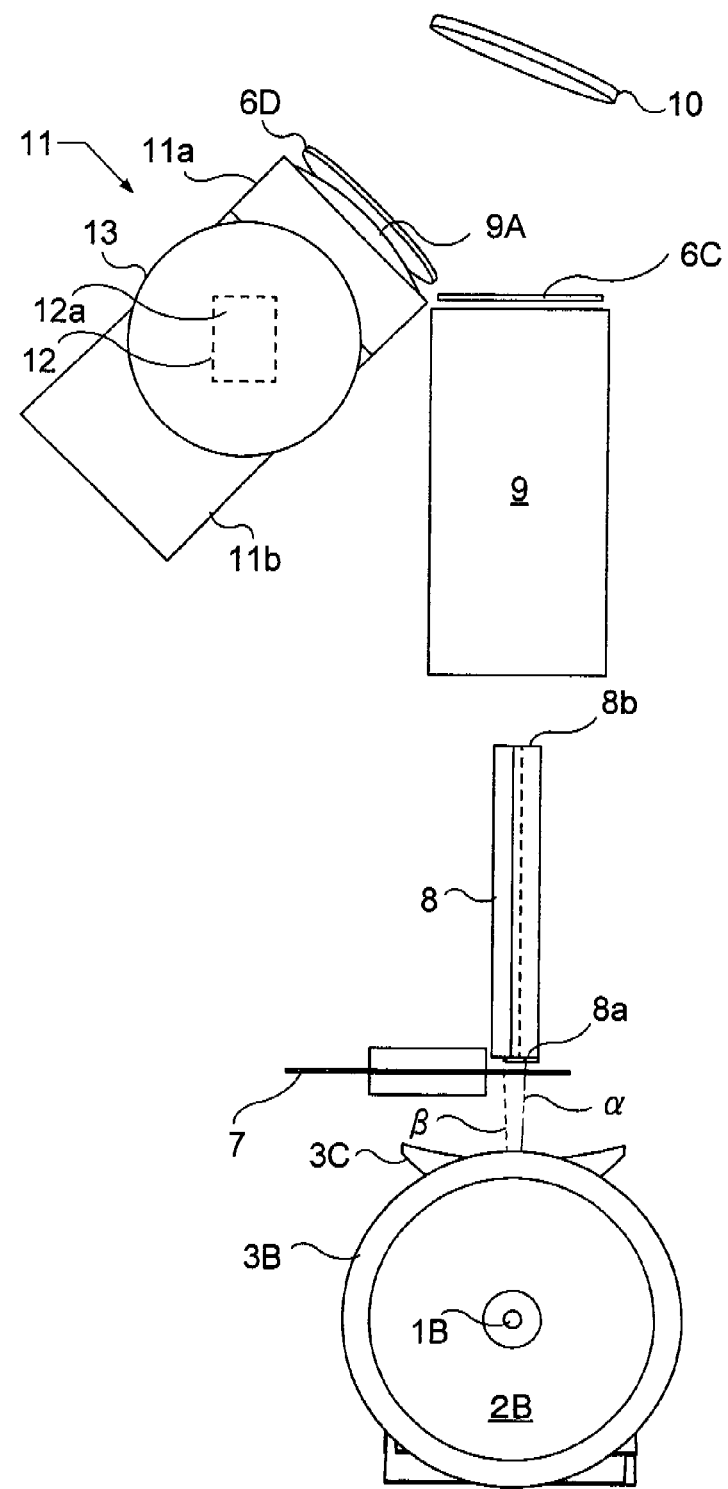
FIG. 2 is a front view showing the first embodiment.

FIGS. 1 and 2 show a first embodiment of an illumination optical system and a projector of the present invention. FIG. 1 shows the projector as seen from above, and FIG. 2 shows the projector as seen from the front. In FIGS. 1 and 2, reference numerals 1A and 1B denote first and second light sources, respectively; reference numerals 2A and 2B denote first and second reflectors (a light condensing optical system), respectively; reference numerals 3A, 3B, and 3C denote first, second, and third condenser lenses, respectively (the light condensing optical system); reference numerals 4A and 4B denote first and second polarization separation surfaces, respectively (a polarization separation optical system); reference numerals 5A and 5B denote first and second reflection surfaces, respectively (a polarization separation optical system); reference numerals 6A, 6B, 6C, and 6D denote first, second, third, and fourth ½ phase difference plates, respectively; reference numeral 7 denotes a color wheel; reference numeral 8 denotes a rod integrator having a rectangular-shaped entrance and exit faces 8a and 8b, respectively; reference numeral 9 denotes a relay optical system; reference numeral 10 denotes a deflection mirror; reference numeral 11 denotes a prism unit; reference numerals 11a and 11b denote first and second prisms, respectively, that form the prism unit 11; reference numeral 12 denotes a display device having a rectangular-shaped image display surface 12a that is a region to be illuminated; and reference numeral 13 denotes a projection lens (a projection optical system).

The first and second light sources 1A and 1B are each a discharge lamp (for example, an ultra high pressure mercury lamp) that emits white light. A reflection surface of each of the first and second reflectors 2A and 2B, which form the light condensing optical system, is formed as a surface having a paraboloid of revolution shape, and the first and second light sources 1A and 1B are arranged at focal points of the first and second reflectors 2A and 2B, respectively. As a result, first and second light beams LA and LB emitted from the first and second light sources 1A and 1B, respectively, leave the first and second reflectors 2A and 2B as substantially parallel light beams. The first light beam LA emitted from the first light source 1A, after being reflected by the lamp reflector 2A to be the parallel light beam, is incident on the first polarization separation surface 4A while being converged by the first condenser lens 3A of the light condensing optical system. On the other hand, the second light beam LB emitted from the second light source 1B, after being reflected by the lamp reflector 2B to be the parallel light beam, is incident on the second polarization separation surface 4B while being condensed by the second condenser lens 3B of the light condensing optical system.

The first polarization separation surface 4A is formed of a wire grid structured so as to carry out polarization separation of light in the visible region. An S-polarization component of the light beam LA, which has been reflected by the first polarization separation surface 4A, is incident on the first ½ phase difference plate 6A. A P-polarization component of the light beam LA, after passing through the first polarization separation surface 4A, is incident on the first reflection surface 5A. The first reflection surface 5A is a reflection coat surface formed of a multilayer film. The P-polarization component of the light beam LA, after being reflected by the first reflection surface 5A, passes through the first polarization separation surface 4A again, to be incident on the first ½ phase difference plate 6A.

The second polarization separation surface 4B is formed of a wire grid structured to perform polarization separation of light in the visible region. An S-polarization component of the light beam LB, after being reflected by the second polarization separation surface 4B, is incident on the first ½ phase difference plate 6A. A P-polarization component of the light beam LB, after passing through the second polarization separation surface 4B, is incident on the second reflection surface 5B. The second reflection surface 5B is a reflection coat surface formed of a multilayer film. The P-polarization component of the light beam LB, after being reflected by the second reflection surface 5B, passes through the second polarization separation surface 4B again, to be incident on the first ½ phase difference plate 6A.

The first ½ phase difference plate 6A is arranged to make the polarization direction of the S-polarization component that has been reflected by the first polarization separation surface 4A or by the second polarization separation surface 4B parallel to the long-side direction of the rectangular shape of the entrance face 8a of the rod integrator 8, and to make the polarization direction of the P-polarization component that has passed through the first polarization separation surface 4A or the second polarization separation surface 4B parallel to the short-side direction of the rectangular shape of the entrance face 8a of the rod integrator 8. That is, The first ½ phase difference plate 6A changes the polarization directions of the S-polarization and P-polarization components of the first and second light beams LA and LB with respect to the first and second polarization separation surface 4A and 4B, and thereby converts the S-polarization component reflected by the first polarization separation surface 4A or by the second polarization separation surface 4B to a first polarization component α, and converts the P-polarization component transmitted through the first polarization separation surface 4A or the second polarization separation surface 4B to a second polarization component β.

In the above-described manner, the first light beam LA emitted from the first light source 1A is separated into the first polarization component α and the second polarization component β by the polarization separation system formed of the first polarization separation surface 4A, the first reflection surface 5A, and the first ½ phase difference plate 5A; and the second light beam LB emitted from the second light source 1B is separated into the first polarization component α and the second polarization component β by the polarization separation optical system formed of the second polarization separation surface 4B, the second reflection surface 5B, and the first ½ phase difference plate 6A. Incidentally, the first ½ phase difference plate 6A is a polarization conversion device provided for achieving the layout of a two-lamp illumination optical system, and the first ½ phase difference plate 6A and third and fourth ½ phase difference plates 6C and 6D, which will be described later, allow a flexible layout of the illumination optical system.

The light beams LA and LB, each having been separated into the first polarization component α and the second polarization component β by the first ½ phase difference plate 6A, are incident on the third condenser lens 3C. The third condenser lens 3C forms the light condensing optical system that is commonly used for the first and second light beams LA and LB. The incident angles with respect to the first and second polarization separation surfaces 4A and 4B need to be large to make the converging angle with respect to the rod integrator 8 satisfactorily small by using only the optical power of the first and second condenser lenses 3A and 3B. But here, since the third condenser lens 3C simultaneously shares the burden of the optical power with the first and second condenser lenses 3A and 3B, this problem is solved with a compact configuration.

The light beams LA and LB passing through and coming out from the third condenser lens 3C are incident on the color wheel 7 that changes the color of the light output therefrom in a time-division manner to achieve color display. The color wheel 7 is formed of a color filter for illuminating the display device 12 by a color sequential method. For example, it is formed of color filters transmitting light of R (red), G (green), and B (blue), respectively. The color wheel 7 is rotated to move the filter portion located at the illumination light transmitting position, and thereby the color of the illumination light is changed sequentially in terms of time. Thus, by displaying image information corresponding to each color on the display device 12, a color image can be projected as a projection image.

Figure 3A:
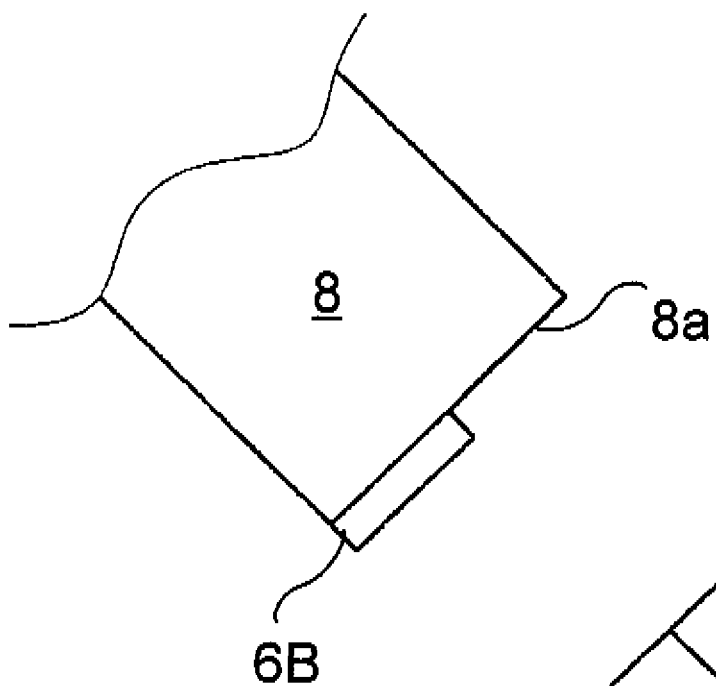
FIGS. 3A and 3B are each an exterior view showing the principal part of a rod integrator.
Figure 3B:
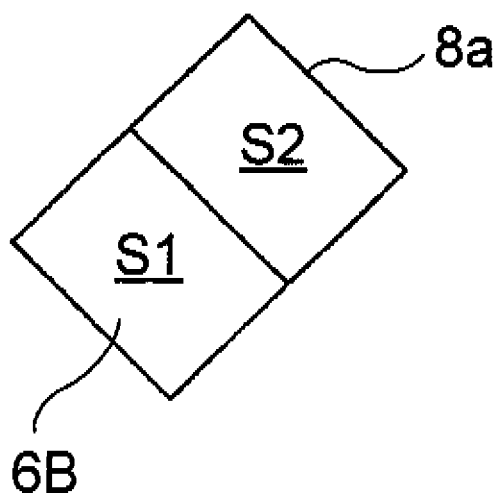

After passing through the color wheel 7, the first polarization component α of each of the light beams LA and LB is incident on the second ½ phase difference plate 6B. The second ½ phase difference plate 6B is provided at the entrance face 8a of the rod integrator 8. The principal part of the rod integrator 8 is shown in FIGS. 3A and 3B. FIG. 3A shows a side view of an exterior of the rod integrator 8, and FIG. 3B shows an exterior appearance of the rod integrator 8 as seen from the side of the entrance face 8a thereof. The rectangular-shaped entrance face 8a is inclined, and the second ½ phase difference plate 6B is placed at a first region S1 of the entrance face 8a.

The second ½ phase difference plate 6B converts the polarization state of the first polarization component α to a polarization state that is equal to the polarization state of the second polarization component β (that is, a polarization state where the direction of the polarization is parallel to the short-side direction of the rectangular shape of the entrance face 8a of the rod integrator 8). The first polarization component a, the polarization of which has been converted by the second ½ phase difference plate 6B, is made, by the light condensing optical system, to form an image at or in the vicinity of the entrance face 8a of the rod integrator 8 to enter the rod integrator 8 through the first region S1 of the entrance face 8a (see FIG. 3B).

After passing through the color wheel 7, the second polarization component β of each of the light beams LA and LB is made, by the light condensing optical system, to form an image at or in the vicinity of the entrance face 8a of the rod integrator 8 to enter the rod integrator 8 through a second region S2 of the entrance face 8a (see FIG. 3B).

As described above, the second ½ phase difference plate 6B is provided at the first region S1 of the entrance face 8a of the rod integrator 8, and the light condensing optical system condenses the first polarization component α onto the first region S1 of the entrance face 8a of the rod integrator 8, while condensing the second polarization component β onto the second region S2 of the entrance face 8a of the rod integrator 8. Thus, the polarization state of the light beam LA from the first light source 1A and the polarization state of the light beam LB from the second light source 1B are both equal to the polarization state of the second polarization component β when they enter the rod integrator 8. Incidentally, the configuration may be changed, as necessary, to a configuration in which the second ½ phase difference plate 6B is placed at the second region S2 of the entrance face 8a of the rod integrator 8 such that the polarization state of the light beam LA from the first light source 1A and the polarization state of the light beam LB from the second light source 1B are both equal to the polarization state of the first polarization component a.

This embodiment, using the rod integrator 8 in the illumination optical system, is configured such that light beams from the two lamps are combined by the polarization separation optical system that spacially separates polarization and by the light condensing optical system that condenses light beams of the same polarization component onto the same position using angle difference, and thereby, this embodiment achieves a compact configuration for combining light beams from the two lamps and converting polarization. Thus, in spite of the compact illumination optical system, it is possible to achieve highly-efficient high-quality bright illumination and obtain a bright high-quality projection image. In addition, the use of the first and second polarization separation surfaces 4A, 4B and the first and second reflection surfaces 5A, 5B in combination makes it easy to make light beams of the different polarization components α and β deflect at different angles. Thus, it is possible, with a simple configuration, to make the light beams of the different polarization components α and β form images at different positions in the entrance face 8a of the rod integrator 8.

The rod integrator 8 is light intensity unifomization means formed as a hollow rod by adhering four flat-surface mirrors together, and has its entrance face 8a at (or in the vicinity of) a secondary light source; the rod integrator 8 uniformizes the spacial energy distribution of the illumination light (the first and second light beams LA and LB) after being condensed by the light condensing optical system. The illumination light that has entered the rod integrator 8 through the entrance face 8a is reflected over and over again by side surfaces (that is, the inner wall surfaces) of the rod integrator 8 to be mixed, and leaves the rod integrator 8 through the exit face 8b as illumination light having spacially uniformized energy distribution. At this time, since the polarization direction is perpendicular or horizontal to the wall surfaces, the illumination light is emitted from the rod integrator 8 as light having a uniform polarization direction, without disturbance of polarization direction.

The shapes (that is, the sectional shapes) of the entrance face 8a and the exit face 8b of the rod integrator 8 are a quadrangular shape that is similar (or substantially similar) to the shape of an image display surface 12a of the display device 12, and the exit face 8b of the rod integrator 8 and the image display surface 12a of the display device 12 are conjugated (substantially conjugated) by the relay optical system 9 for illumination and the like. Thus, with the distribution of brightness at the exit face 8b made uniform by the mixing effect described above, efficient and uniform illumination of the image display surface 12a of the display device 12 is achieved. That is, a plurality of secondary light source images are formed at a pupil position of the relay optical system 9 according to the number of times of reflections occurring within the rod integrator 8 to be superimposed on each other by the relay optical system 9, and thereby uniform illumination is realized. The rod integrator 8 is not limited to a hollow rod, and it maybe a glass rod formed of a quadrangular-prism shaped glass body.

The rod integrator 8 is followed by the relay optical system 9, the third ½ phase difference plate 6C, the deflection mirror 10, the fourth ½ phase difference plate 6D, the entrance lens 9A (see FIG. 2), the prism unit 11, and the display device 12. Illumination light coming out from the rod integrator 8 enters the relay optical system 9. The relay optical system 9, together with the entrance lens 9A, performs uniform illumination by projecting the image of the exit face 8b of the rod integrator 8 onto the image display surface 12a of the display device 12. As already mentioned, the exit face 8b of the rod integrator 8 is conjugate with the image display surface 12a of the display device 12, and by making the exit face 8b of the rod integrator 8 and the display region of the reflection-type display device 12 substantially similar in shape, highly efficient illumination can be achieved.

Illumination light emitted from the relay optical system 9 is reflected by the deflection mirror 10 after passing through the third ½ phase difference plate 6C, and then passes through the fourth ½ phase difference plate 6D. The third ½ phase difference plate 6C converts the polarization direction of the illumination light that has passed through the relay optical system 9 to be parallel or perpendicular to an approach plane that forms the angle of incidence on the deflection mirror 10. As a result, the light is reflected by the deflection mirror 10 without disturbance of polarization. The fourth ½ phase difference plate 6D converts the polarization direction of the illumination light reflected by the deflection mirror 10 to be parallel or perpendicular to an approach plane that forms the angle of incidence on the critical surface F2 of the prism unit 11. As a result, the light is reflected by the critical surface F2 without disturbance of polarization. As described above, by controlling the polarization direction of the illumination light, by using the third and fourth ½ phase difference plates 6C and 6D, before the illumination light is incident on the reflection surfaces, disturbance of linear polarization can be prevented from occurring at the reflection surfaces.

The illumination light emitted from the fourth ½ phase difference plate 6D passes through the entrance lens 9A (see FIG. 2) and enters the prism unit 11. The prism unit 11 is formed of two prisms, namely, the first prism 11a and the second prism 11b. The first prism 11a has a first incidence surface F1, the critical surface F2, and a first emission surface F3, and the second prism 11b has a second incidence surface F4 and a second emission surface F5. The critical surface F2 of the first prism 11a and the second incidence surface F4 of the second prism 11b face each other with a layer of air therebetween.

The entrance lens 9A is adhered to the first incidence surface F1 of the first prism 11a such that the illumination light is made telecentric. Instead of adhering the entrance lens 9A to the first incidence surface F1, the first incidence surface F1 of the first prism 11a may be formed as a curved surface so that the first prism 11a takes over the function of the entrance lens 9A. As already mentioned, the entrance lens 9A, together with the relay optical system 9, relays the illumination light to form an image of the exit face 8b of the rod integrator 8 on the image display surface 12a of the display device 12, and thus the image of the exit face 8b of the rod integrator 8 is formed on the image display surface 12a which is the region to be illuminated.

The illumination light passes through the entrance lens 9A to become telecentric light beams, and enters the first incidence surface F1 of the first prism 11a. The critical surface F2 of the first prism 11a is positioned to totally reflect the illumination light (that is, the illumination light reaches the critical surface F2 at an angle that fulfills the condition for the total reflection). Thus, the illumination light is reflected by the critical surface F2, and emitted from the first emission surface F3 of the first prism 11a to illuminate the image display surface 12a of the display device 12.

On the image display surface 12a of the display device 12, a two-dimensional image is formed by modulating the intensity of the illumination light. Here, the display device 12 is assumed to be a digital micromirror device. This, however, is not meant to limit the display device 12 for use here, and any other reflection-type display device (for example, a liquid crystal display device) suitable for the projection system may be used instead. A pixel of the digital micromirror device has an axis of rotation (a deflection axis) that forms an angle 45° with a side of a rectangle image display region that the image display surface 12a forms, and the pixel is rotated, for example, by ±12° around the axis of rotation, to achieve an ON or OFF state.

In a case where a digital micromirror device is used as the display device 12, light incident thereon is spatially modulated by being reflected by the micromirrors which are individually either in the ON or OFF state (for example, states inclined by ±12°). Here, by allowing merely light that is reflected by a micromirror in the ON state to pass through the prism unit 11, the image displayed on the display device 12 is projected onto a screen (not shown) in a magnified manner. That is, in an image-display state, light beams (that is, projection light) reflected by the micromirror in the ON state reenters the first prism 11a through the first emission surface F3 of the first prism 11a, and reaches the critical surface F2 of the first prism 11a. The projection light is incident on the critical surface F2 at an angle that does not fulfill the condition for the total reflection, and thus passes through the critical surface F2 to enter the second prism 11b through the second incidence surface F4 via the layer of air. Projection light emitted from the second emission surface F5 of the second prism 11b reaches the screen via the projection lens 13, and forms a projection image of the image display surface 12a.

As the first, second, third, and fourth ½ phase difference plates 6A, 6B, 6C, and 6D, a polymeric film, a quarts plate, a form birefringence plate, or the like can be used. The second ½ phase difference plate 6B is not limited to be positioned at the entrance face 8a of the rod integrator 8, and, it may be positioned, for example, at or in the vicinity of the pupil position of the relay optical system 9, which is a position optically conjugate with the entrance face 8a of the rod integrator 8. In this case, a plurality of secondary light source images are formed and arranged at the pupil position of the relay optical system 9, and accordingly, a corresponding number of the second ½ phase difference plates 6B are arranged.

The first polarization separation surface 4A, the second polarization separation surface 4B, the first reflection surface 5A, the second reflection surface 5B may each be provided with an angle adjustment mechanism (not shown). With this structure, even if variation of the imaging positions at the entrance face 8a of the rod integrator 8 occurs due to variation of the lamp unit when, for example, a lamp is replaced, it is possible to optimize the positional setting and obtain a bright projection image by correcting the variation by the angle adjustment mechanism.

Second Embodiment

Figure 4:
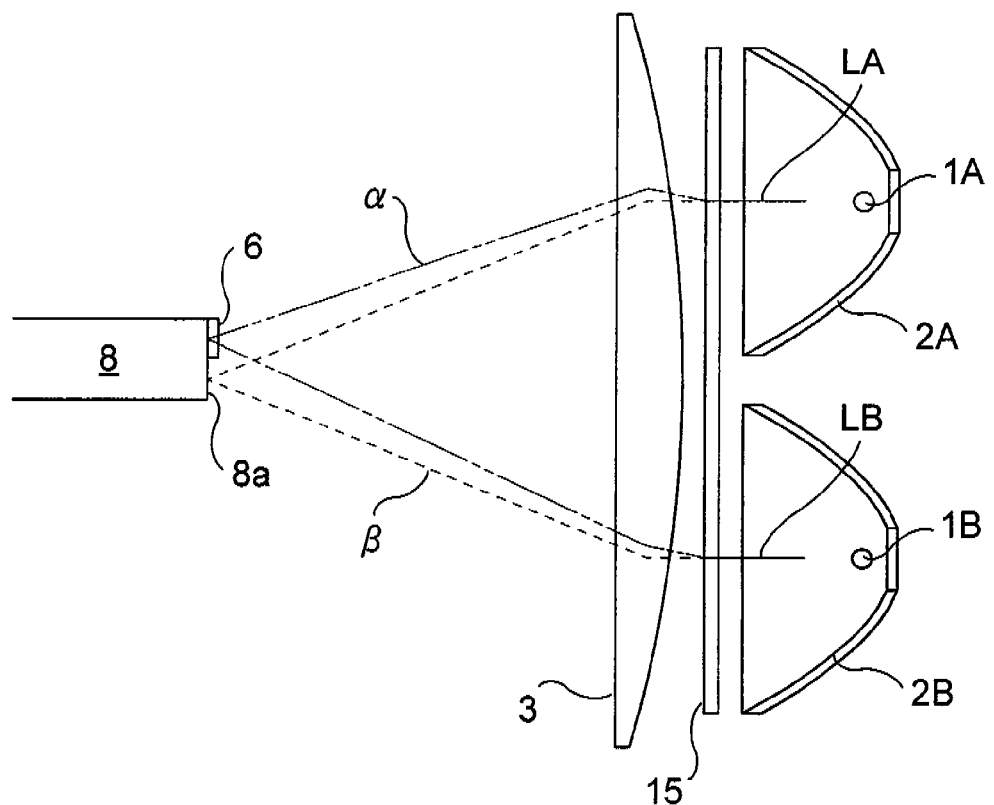
FIG. 4 is a plan view showing the principal part of a second embodiment.

See FIG. 4

FIG. 4 shows the principal part of a second embodiment of the illumination optical system and the projector. The second embodiment is a modified example of the first embodiment described above (see FIG. 1, etc.); a rod integrator 8 and following portions of the second embodiment are similar in optical configuration to those of the first embodiment, but a light condensing optical system and a polarization separation optical system are different in optical configuration from those of the first embodiment (a color wheel 7 is not illustrated in FIG. 4). That is, the second embodiment is configured such that, as the polarization separation optical system, a birefringence diffraction grating 15 is used instead of the first and second polarization separation surfaces 4A and 4B and the first and second reflection surfaces 5A and 5B, and, as the light condensing optical system, a condenser lens 3 is used instead of the first to third condenser lens 3A, 3B, and 3C. Incidentally, at a first region S1 (see FIG. 3B) of an entrance face 8a of the rod integrator 8, a ½ phase difference plate 6 is placed instead of the second ½ phase difference plate 6B. The configuration and the function of the ½ phase difference plate 6 are the same as those of the second ½ phase difference plate 6B.

The birefringence diffraction grating 15 is a diffraction grating formed of a birefringence material. When first and second light beams LA and LB pass through the birefringence diffraction grating 15, which diffracts different polarization components in different directions, variation occurs in the direction in which the light beams LA and LB travel. In this embodiment, it is assumed that the birefringence diffraction grating 15 is formed by sealing liquid crystal between a molded-resin blaze-type diffraction grating formed on a glass substrate and another glass substrate facing the diffraction grating. The liquid crystal molecules are aligned along the blaze direction. The refractive index of the liquid crystal molecules in a polarization direction parallel to the blaze direction is equal to the refractive index of the resin that forms the diffraction grating, while the refractive index of the liquid crystal molecules in a polarization direction that is perpendicular to the blaze direction is different from the refractive index of the resin. Thus, the birefringence diffraction grating 15 does not function as a diffraction grating in the direction in which the liquid crystal particles and the resin forming the diffraction grating have the same refractive index, and a light beam of the polarization component in this direction travels straight through the birefringence diffraction grating 15, while the birefringence diffraction grating 15 functions as a diffraction grating with respect to a light beam of the polarization component polarized in the direction perpendicular to the blaze direction, and a light beam of the polarization component in this direction travels in a direction determined by the angle of diffraction. As a result, light beams of different polarization components α, β are incident on a condenser lens 3 at different incident angles, to form images at different positions. Incidentally, the birefringence diffraction grating 15 may be one that performs polarization separation by form birefringence.

First and second light sources 1A and 1B and the first and second reflectors 2A and 2B are arranged side by side, parallel to each other, and thus light beams leaving the first and second reflectors 2A and 2B, each having a paraboloid reflection surface, are parallel light beams traveling in the same direction. Light beams of the first polarization component a resulting from the light beams from the first and second light sources 1A and 1B, being diffracted by the birefringence diffraction grating 15 to be deflected to travel obliquely, commonly pass through the condenser lens 3, and form an image on a first region S1 (see FIG. 3B) of the entrance face 8a of the rod integrator 8. On the other hand, light beams of the second polarization component 3 from the first and second light sources 1A and 1B that pass straight through the birefringence diffraction grating 15 commonly pass through the condenser lens 3, and form an image on a second region S2 (see FIG. 3B) of the entrance face 8a of the rod integrator 8.

Since the first region S1 of the entrance face 8a of the rod integrator 8 is provided with the ½ phase difference plate 6, the polarization state of the first polarization component α is converted to the polarization state of the second polarization component β. As a result, the light beams LA and LB from the first and second light sources 1A and 1B both have the polarization state of the second polarization component β when they enter the rod integrator 8. Incidentally, the configuration may be changed, as necessary, to a configuration in which the second ½ phase difference plate 6B is placed at the second region S2 of the entrance face 8a of the rod integrator 8 such that the polarization state of the light beam LA from the first light source 1A and the polarization state of the light beam LB from the second light source 1B are both equal to the polarization state of the first polarization component a.

Features, Etc. of the Embodiments

As is clear from the description hereinabove, the embodiments include configurations of an illumination optical system and a projector described in (#1) to (#9).

(#1)

An illumination optical system characterized by being provided with: a first light source that emits a first light beam; a second light source that emits a second light beam; a light condensing optical system that condenses the first light beam and the second light beam; a polarization separation optical system that separates each of the first light beam and the second light beam into a first polarization component and a second polarization component; a ½ phase difference plate that converts a polarization state of the first polarization component to a polarization state equal to a polarization state of the second polarization component; a rod integrator that uniformizes spatial energy distribution of the first light beam and the second light beam that have undergone condensation by the light condensing optical system; and a relay optical system that forms an image of an exit face of the rod integrator on a region to be illuminated, the illumination optical system also characterized in that the light condensing optical system condenses the first polarization component onto a first region of an entrance face of the rod integrator, and condenses the second polarization component onto a second region of the entrance face of the rod integrator, and that the ½ phase difference plate is placed at the first region of the entrance face of the rod integrator or at a position conjugate with the first region of the entrance face of the rod integrator.

(#2)

The illumination optical system described in (#1) characterized in that the polarization separation optical system includes: a first polarization separation surface that reflects an S-polarization component of the first light beam and transmits a P-polarization component of the first light beam; a first reflection surface that reflects the P-polarization component that has passed through the first polarization separation surface such that the P-polarization component passes through the first polarization separation surface again at an angle different from an angle at which the S-polarization component is reflected by the first polarization separation surface; a second polarization separation surface that reflects an S-polarization component of the second light beam, and transmits a P-polarization component of the second light beam; and a second reflection surface that reflects the P-polarization component that has passed through the second polarization separation surface such that the P-polarization component passes through the second polarization separation surface again at an angle different from an angle at which the S-polarization component is reflected by the second polarization separation surface.

(#3)

The illumination optical system described in (#2) characterized in that the polarization separation optical system further includes a polarization conversion device that converts the S-polarization component coming from the first polarization separation surface and the S-polarization component coming from the second polarization separation surface to the first polarization component while converting the P-polarization component coming from the first polarization separation surface and the P-polarization component coming from the second polarization separation surface to the second polarization component, or that converts the S-polarization component coming from the first polarization separation surface and the S-polarization component coming from the second polarization separation surface to the second polarization component while converting the P-polarization component coming from the first polarization separation surface and the P-polarization component coming from the second polarization separation surface to the first polarization component.

(#4)

The illumination optical system described in (#2) or (#3) characterized in that the first and second polarization separation surfaces are each formed of a wire grid.

(#5)

The illumination optical system described in (#1) characterized in that the polarization separation optical system is a birefringence diffraction grating.

(#6)

The illumination optical system described in any one of (#1) to (#5) characterized in that the light condensing optical system includes: a reflector formed as a parabolic mirror or an elliptic mirror; and a condenser lens.

(#7)

The illumination optical system described in (#6) characterized in that the reflector includes: a first reflector that condenses the first light beam; and a second reflector that condenses the second light beam, and that the condenser lens includes: a first condenser lens that condenses the first light beam reflected by the first reflector; a second condenser lens that condenses the second light beam reflected by the second reflector; and a third condenser lens that condenses the first and second light beams having passed through the first and second condenser lenses together.

(#8)

A projector characterized by being provided with: the illumination optical system described in any one of (#1) to (#7); a display device having an image display surface to be illuminated by the illumination optical system; and a projection optical system that magnifies and projects an image of the image display surface onto a screen.

(#9)

The projector described in (#8) characterized in that the display device is a single digital micromirror device, and a color wheel is further provided in the vicinity of the entrance face of the rod integrator.

According to the configuration described in (#1), in the illumination optical system using the rod integrator, the two light beams from the two lamps are combined by spacially performing polarization separation to condense light beams of the same polarization component onto the same position by making use of a difference in angle. This makes it possible to combine two light beams from two lamps and perform polarization conversion with a compact configuration. Specifically, the illumination optical system is configured such that the two light beams from the two lamps are combined by condensing one portion of one light beam and one portion of the other light beam that have a same polarization characteristic are condensed onto one region of the entrance face of the rod integrator while condensing the other portion of one light beam and the other portion of the other light beam that have another same polarization characteristic are condensed onto the other region of the entrance face of the rod integrator, and then converting the polarization of either one of the resulting condensed portions of the light beams to the polarization of the other. This makes it possible to realize a compact illumination optical system capable of performing highly-efficient, high-quality, and bright illumination. Thus, the provision of the illumination optical system makes it possible to realize a projector capable of obtaining bright and high-quality projection image.

Incidentally, the position of the ½ phase difference plate is not limited to the first region of the entrance face of the rod integrator, and it may be placed at a position conjugate with the first region. For example, it may be placed at a conjugate position (the pupil position or a vicinity thereof) within the relay optical system, that is, a position within the relay optical system that is a position conjugate with the first region of the entrance face of the rod integrator. Since the first and second polarization components are alternately positioned corresponding to the first and second regions, a ½ phase difference plate is provided at a position corresponding to the first region.

According to the configuration described in (#2), the use of the first and second polarization separation surfaces and the first and second reflection surfaces makes it easy to make each of light beams of different polarization components deflect at different angles. Thus, it is possible, with a simple configuration, to make the light beams of the different polarization components form images at different positions in the entrance face of the rod integrator.

The use of the polarization conversion device of the configuration described in (#3) makes it possible to freely set the polarization direction at the entrance face of the rod integrator.

If a wire grid is used as in the configuration described in (#4), even in a case in which reflection is used to make light beams of different polarization components form images at different positions in the entrance face of the rod integrator, the polarization separation characteristic is less angle-dependent, and the reflection angle can be set freely. Thus, a more flexible layout of light sources, a compact configuration, and furthermore, reduction of weight can be achieved. By using a birefringence diffraction grating as the polarization separation optical system as in the configuration described in (#5), it is possible to make the illumination optical system and the projector more compact and lightweight.

According to the configuration described in (#6), or preferably the configuration described in (#7), it is possible to achieve more efficient, higher-quality and brighter illumination while achieving satisfactorily high polarization separation performance and compactness.

According to the configuration described in (#8), it is possible to obtain a bright projector capable of utilizing polarization highly efficiently, and such a projector produces 3D projection images or high-contrast bright projection images, making it possible for a user to appreciate projection on a large screen. According to the configuration described in (#9), it is possible to achieve polarization conversion and the combining of light beams from two lamps in a projector using a digital micromirror device that suits the rod integrator, and thus to obtain a bright 3D projection image or a high-contrast projection image without deterioration of quality resulting from the generation of ghost or the like.

What is claimed is:

1. An illumination optical system, comprising:
a first light source that emits a first light beam;
a second light source that emits a second light beam;
a light condensing optical system that condenses the first light beam and the second light beam;
a polarization separation optical system that separates each of the first light beam and the second light beam into a first polarization component and a second polarization component;
a ½ phase difference plate that converts a polarization state of the first polarization component to a polarization state equal to a polarization state of the second polarization component;
a rod integrator that uniformizes spatial energy distribution of the first light beam and the second light beam that have undergone condensation by the light condensing optical system; and
a relay optical system that forms an image of an exit face of the rod integrator on a region to be illuminated,
wherein
the light condensing optical system condenses the first polarization component onto a first region of an entrance face of the rod integrator, and condenses the second polarization component onto a second region of the entrance face of the rod integrator; and
wherein
the ½ phase difference plate is placed at the first region of the entrance face of the rod integrator or at a position conjugate with the first region of the entrance face of the rod integrator.

2. The illumination optical system of claim 1,
wherein
the polarization separation optical system includes:
a first polarization separation surface that reflects an S-polarization component of the first light beam and transmits a P-polarization component of the first light beam;
a first reflection surface that reflects the P-polarization component that has passed through the first polarization separation surface such that the P-polarization component passes through the first polarization separation surface again at an angle different from an angle at which the S-polarization component is reflected by the first polarization separation surface;
a second polarization separation surface that reflects an S-polarization component of the second light beam, and transmits a P-polarization component of the second light beam; and
a second reflection surface that reflects the P-polarization component that has passed through the second polarization separation surface such that the P-polarization component passes through the second polarization separation surface again at an angle different from an angle at which the S-polarization component is reflected by the second polarization separation surface.

3. The illumination optical system of claim 2,
wherein
the polarization separation optical system further includes a polarization conversion device that converts the S-polarization component coming from the first polarization separation surface and the S-polarization component coming from the second polarization separation surface to the first polarization component while converting the P-polarization component coming from the first polarization separation surface and the P-polarization component coming from the second polarization separation surface to the second polarization component, or that converts the S-polarization component coming from the first polarization separation surface and the S-polarization component coming from the second polarization separation surface to the second polarization component while converting the P-polarization component coming from the first polarization separation surface and the P-polarization component coming from the second polarization separation surface to the first polarization component.

4. The illumination optical system of claim 2, wherein the first and second polarization separation surfaces are each formed of a wire grid.

5. The illumination optical system of claim 3, wherein the first and second polarization separation surfaces are each formed of a wire grid.

6. The illumination optical system of claim 1, wherein the polarization separation optical system is a birefringence diffraction grating.

7. The illumination optical system of claim 1, wherein the light condensing optical system includes: a reflector formed as a parabolic mirror or an elliptic mirror; and a condenser lens.

8. The illumination optical system of claim 7,
wherein
the reflector includes: a first reflector that condenses the first light beam; and a second reflector that condenses the second light beam, and
the condenser lens includes: a first condenser lens that condenses the first light beam reflected by the first reflector; a second condenser lens that condenses the second light beam reflected by the second reflector; and a third condenser lens that condenses the first and second light beams having passed through the first and second condenser lenses together.

9. A projector, comprising:
an illumination optical system;
a display device having an image display surface to be illuminated by the illumination optical system; and
a projection optical system that magnifies and projects an image formed on the image display surface onto a screen, wherein
the illumination optical system is provided with:
- a first light source that emits a first light beam;
- a second light source that emits a second light beam;
- a light condensing optical system that condenses the first light beam and the second light beam;
- a polarization separation optical system that separates each of the first light beam and the second light beam into a first polarization component and a second polarization component;
- a ½ phase difference plate that converts a polarization state of the first polarization component to a polarization state equal to a polarization state of the second polarization component;
- a rod integrator that uniformizes spatial energy distribution of the first light beam and the second light beam that have undergone condensation by the light condensing optical system; and
- a relay optical system that forms an image of an exit face of the rod integrator on a region to be illuminated;

wherein
the light condensing optical system condenses the first polarization component onto a first region of an entrance face of the rod integrator, and condenses the second polarization component onto a second region of the entrance face of the rod integrator; and wherein
the ½ phase difference plate is placed at the first region of the entrance face of the rod integrator or at a position conjugate with the first region of the entrance face of the rod integrator.

10. The projector of claim 9, wherein the display device is a single digital micromirror device, and a color wheel is further provided in a vicinity of the entrance face of the rod integrator.

\* \* \* \* \*